Nov. 3, 1964 A. J. GELLES 3,155,917
ELECTRONIC APPARATUS
Filed May 7, 1959
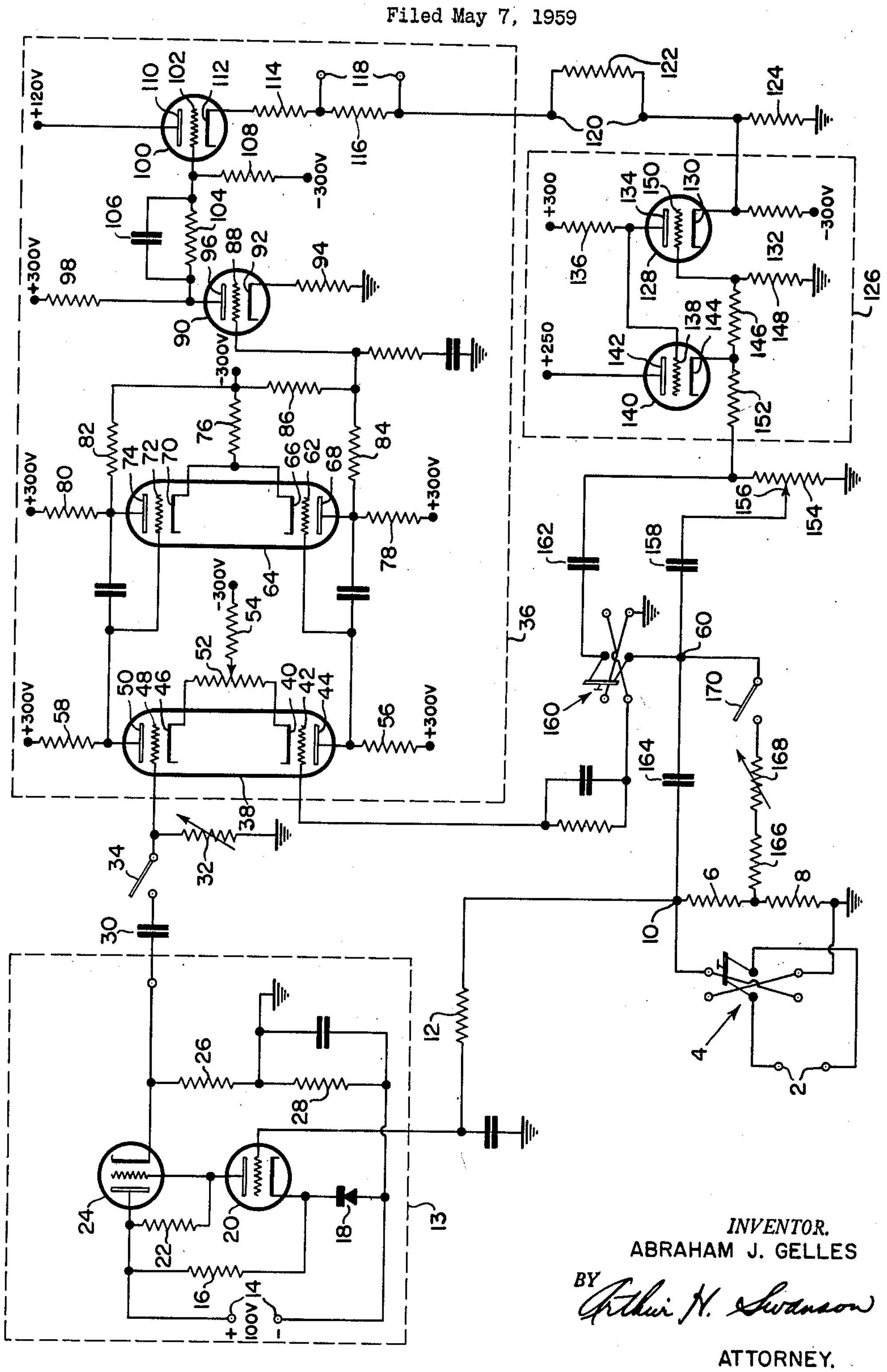
INVENTOR.
ABRAHAM J. GELLES
BY Arthur H. Swanson
ATTORNEY.

United States Patent Office 3,155,917
Patented Nov. 3, 1964

3,155,917
ELECTRONIC APPARATUS
Abraham J. Gelles, Philadelphia, Pa., assignor to Honeywell Inc., a corporation of Delaware
Filed May 7, 1959, Ser. No. 811,585
3 Claims. (Cl. 330—85)

This invention relates to electronic apparatus, and more particularly to electronic control apparatus, suitable for controlling industrial processes.

In the art relating to industrial control processes, means have been provided for obtaining electrical signal representative of the instant condition of some characteristic of the process being controlled. It is usual that the signal thus obtained is compared with a signal of known value representative of the desired condition in the process of the control. The difference between those two signals is then applied as an input signal to a control instrument. The control instrument consists, essentially, of an amplification circuit and means associated therewith for characterizing the output in such a way as to obtain a smooth and accurate control over the process being controlled. It may be appreciated that the signals applied to the input of the controlled instrument may vary widely in magnitude from a relatively large signal representating a large deviation of the condition of the control process to a very small signal when the process is operating very near to the control condition.

When the difference or error signal is a small direct current signal, particular efforts must be made to render the amplification circuit capable of providing suitable amplification of the input signal without having that signal distorted or having spurious signals introduced as a result of drift in the amplifier itself. Heretofore, control circuits designed for such use have included means for converting the small direct current input signal into an alternating current signal which is, in turn, amplified and then re-converted into an amplified direct current signal. Experience has indicated that the means for accomplishing the conversion of the D.C. signals into corresponding alternating signals and then the re-conversion of the signals back to D.C. have constituted a substantial expense item in the structure of the control systems. Also such converters imposed a frequency response limitation which has been found, on occasion, to be undesirable.

It is accordingly an object of the present invention to provide an improved all electronic control apparatus which obviates the necessity of signal conversion and reconversion.

It is another object of this invention to provide improved control apparatus as set forth which features three mode characterizations of the signal. The three modes of the characterization are known in the art as derivative or rate, integral or reset, and proportional adjustments.

It is a further object of this invention to provide an improved signal amplifier circuit which is relatively free from variations in line voltage.

In accomplishing these and other objects, there has been provided, in accordance with the present invention, a differential type amplifier which is self-compensating with respect to D.C. drift. The output of the differential amplifier sections are fed to a current amplifier wherein a voltage signal, developed across a resistor in the cathode circuit of the current amplifier, is applied as input to a feedback circuit. The feedback circuit includes a feedback amplifier which supplies an amplified voltage signal to a proportional band adjustment and also to an integral or reset circuit. These two circuits are connected to a summing junction which is, in turn, connected to the signal input circuit. Also connected to the signal input circuit is a derivative or rate amplifier circuit, the output of which is applied to one input terminal of the differential amplifier.

A better understanding of this invention may be had from the following detailed description when read in connection with the accompanying drawing in which the single figure is a schematic circuit diagram of a control circuit embodying the present invention.

Referring to the drawing in more detail, there is shown a pair of signal input terminals 2 which may be connected to a suitable signal transducer or the like. These terminals are connected through a reversing switch 4 across a pair of input resistors 6 and 8 with one of the terminals being connected also to ground. A junction 10 at the end of the input resistors 6 and 8 opposite from the ground connection is connected through a suitable R.C. network 12 to the input of a derivative or rate amplifier circuit 13.

The rate amplifier circuit 13 includes a floating D.C. power supply, which may, for example, be on the order of 100 volts. This is represented by the power supply terminals 14. This power supply is referred to as being floating in that neither of the input terminals is connected directly to ground. Connected across the power supply terminals 14 is a voltage dividing network comprising a resistor 16 and a Zener diode 18. At the junction between these elements, there is connected the cathode of a control tube 20. The anode of the control tube 20 is referred back to the positive terminal of the power supply 14 through a suitable load resistor 22. The potential developed at the anode of the control tube 20 is applied as a control signal to the control grid of a regulator tube 24. The regulator tube 24 is serially connected in the supply line with the anode connected to the positive terminal 14 of the power supply. The cathode of the tube 24 is connected through a pair of serially connected voltage dividing resistors 26 and 28 to the negative terminal of the power supply. The junction between the two resistors 26 and 28 is connected to ground. The output of this amplifier is taken at the junction between the cathode of the tube 24 and the resistor 26.

In some respects the foregoing configuration somewhat resembles that of a voltage regulator. In a voltage regulator, however, the control grid of the tube 20 would be connected to the junction between the resistors 26 and 28. In the present configuration, however, the control grid of the control tube 20 carries also the input signal of the input terminals 2. One advantage of this particular configuration is that a desired amplification of the input signal is obtained while maintaining a relative freedom from variations in line voltage as applied to the input terminals 14. Another advantage of this configuration is that it provides a linear response to a relatively wide range of input signal amplitude.

The output taken from the cathode of the tube 24 is applied across a differentiating circuit comprising a capacitor 30 and a variable resistor 32. A switch 34 is included in the differentiator net to selectively eliminate the rate or derivative function from the operation of the amplifier when such function is not wanted. The signal differentiated by the differentiating circuit is applied as input to the main amplifier circuit 36.

The input stage of the main amplifier circiut comprises a dual-triode tube connected in a circuit which has become known either as a differential amplifier or as a "long tail pair." The first stage includes the tube 38 which has a first cathode 40, a first control grid 42, and a first anode 44. The tube also includes a second cathode 46, a second control grid 48, and a second anode 50. The two cathodes are connected together through a slidewire resistor 52. The slider of which is connected through a common cathode resistor 54 to a large negative power supply voltage. The first anode 44 is connected through a load resistor 56 to a large positive power supply terminal. Similarly, the second anode 50 is connected through the load resistor 58 to the same large positive voltage supply. To the first control grid 42 is applied a composite signal from a summing junction 60 to be discussed more fully hereinafter. The second control grid 48 has applied thereto the differentiated signal from the rate amplifier 13 when the rate circuit switch 34 is closed. When the switch 34 is open, the grid 48 is tied to ground through the resistor 32. An output signal is obtained from the first anode 44 of the tube 38 and applied to the first control grid 62 of a second stage amplifier tube 64 which is also a dual-triode connected in the differential amplifier or "long tail pair" configuration. The second tube 64 also includes a first cathode 66 and a first anode 68. Additionally there is a second cathode 70, a second control grid 72, and a second anode 74. The cathodes 66 and 70 are connected together at a common cathode resistor 76, the other end of which is connected to the large negative power supply voltage. As in the case of the first dual-triode, the first anode 68 of the second tube is connected through a load resistor 78 to a positive high voltage supply and the second anode is connected through a load resistor 80 also to the positive high voltage supply. A second output signal obtained from the second anode 50 of the first tube is applied to the control grid 72 of the second tube.

The output signals derived from the first and second anodes of the second tube are combined to produce a single-ended output signal. Thus, the anode 74 is connected through a terminating resistor 82 to the negative terminal of the high voltage supply. Similarly, the anode 78 is connected through a first coupling resistor 84 and a second resistor 86 to the negative terminal of the power supply. The output of the second tube is taken from the junction between the resistors 84 and 86 and applied as input signal to the grid 88 of a tube 90. The cathode 92 of the tube 90 is connected through a cathode resistor 94 to ground. The anode 96 of the tube 90 is connected through a suitable load resistor 98 to the positive high voltage supply.

The power stage of this amplifier comprises a cathode-follower amplifier represented by a tube 100. The control grid 102 of the tube 100 is connected through a coupling network, including the resistor 104 and capacitor 106, to the anode 96 of the tube 90. The resistor 108, connected at one end to the negative high voltage supply and at the other end to the grid 102, cooperates with the resistors 104 and 98 to form a voltage divider to establish the operating point of the tube 100. The anode 110 of the tube 100 is connected directly to a power supply terminal while the cathode 112 is connected through suitable resistors to ground. Of these, resistors, the first resistor 114 constitutes a current limiting cathode resistor. The second resistor 116 is a small voltage developing resistor across which are connected a pair of test terminals 118. A pair of terminals 120 constitute the output terminals for the system. Across these terminals 120, there is shown connected a resistor 122 which is representative of any suitable load device. A resistor 124 establishes a voltage level at which point a feedback signal may be derived for application to the input of the feedback amplifier 126.

The feedback amplifier 126 is similar in structure to the rate amplifier 13 in that it provides a wide band amplification of the signal developed across the resistor 124 and is substantially insensitive to variations in power supply voltage. One main difference between this amplifier and the rate amplifier 13 is that the rate amplifier 13 provides a single phase reversal of the applied signal, to provide a correct signal for application to the differential amplifier 36, while this amplifier 126 provides no phase reversal. This amplifier comprises a first tube 128, the cathode 130 of which is connected directly to the upper end of the resistor 124. A large resistor 132 is connected between the cathode 130 and a negative terminal of the high voltage supply. The anode 134 of the tube 128 is connected, through a suitable load resistor 136, to the positive terminal of the high voltage supply. The anode 134 is connected to the control grid 138 of a cathode-follower tube 140. The anode 142 of the tube 140 is connected directly to a somewhat lower voltage tap on the high voltage supply. The cathode 144 of the tube 140 is connected through a pair of cathode resistors 146 and 148 to ground. The junction between the resistors 146 and 148 is connected directly to the control grid 150 of the tube 128. This interconnection of the tubes of 140 and of 128 provide a voltage regulator action which tends to neutralize any deviations that would ordinarily be caused by normal shifts in line voltage. The output of the feedback amplifier is taken directly from the cathode 144 through a resistor 152 to the upper end of a feedback resistance slidewire 154. The slider 156 on the slidewire 154 is connected to one side of a capacitor 158. This capacitor shall be identified as the reset or integrating capacitor. The other side of the capacitor 158 is connected to the summing junction 60.

The summing junction 60, it will be recalled, is connected to the input of the amplifier 36. Interposed between the summing junction 60 and the input to the amplifier 36 is a reversing switch 160. This switch is preferably in the form of a make-before-break, double-pole, double-throw switch. The switch 160 characteristically has a first and second movable arm and a pair of fixed contacts arranged for engagement with each of the two movable arms. The four fixed contacts are cross-connected, substantially as shown, with one diagonal pair being grounded, the other diagonal pair being connected directly to the input of the amplifier 36. One of the movable arms is connected to the summing junction 60 while the other movable arm is connected to a holding capacitor 162 which is connected to the junction between the resistors 152 and the slidewire 154. Between the summing junction 60 and the input junction 10 there is connected an input capacitor 164. Connected between the summing junction 60 and the junction between the input resistors 6 and 8 there is connected a pair of integrating, or reset resistors 166 and 168, the latter of which is variable. A switch 170 is connected serially in the circuit between the summing junction 60 and the resistor 168.

In discussing the operation of the foregoing circuit, it is first assumed that there is a static condition existing; that is, it is assumed that there is substantially zero signal applied to the input terminals 2. Under such a static condition, the current flow through the resistor 124 causes a minimum signal to be applied to the input of the feedback amplifier which in turn establishes a voltage signal across the slidewire resistor 154. This produces, in turn, a voltage across the capacitor 158 which is of just such magnitude as will maintain the system in the aforesaid static state. This, of course, is assuming that the switch 160 is closed on the side such that the summing junction 60 is connected to the input of the amplifier 136 and the capacitor 162 is connected to ground. Further assuming, for the moment, that the switch 34 and the switch 170 are opened, removing the derivative and integral functions from the operative of the circuit, the remainder of the circuit is such that the summing junction 60 is maintained substantially at zero potential with respect to ground. Since the amplifier 36 is a very high gain amplifier, the charge potential necessary to maintain a minimum current condition through the output terminals 120 is extremely small.

The maintaining of this summing junction 60 substantially at ground potential may be considered from the point of view that the potential across the capacitor 158 is substantially equal and opposite to the potential drop across that portion of the slidewire resistor 154 between the slider 156 and ground. Similarly, the potential across the capacitor 164 should be equal and opposite to the potential across the serially connected resistors 6 and 8. When an input signal is applied to the input terminals 2, it is then applied across the serially connected resistors 6 and 8 unbalancing the relationship just set forth. That unbalance results in a signal other than zero appearing at the summing junction 60 and is, thereupon applied to the input of the amplifier 36. The signals amplified in the amplifier 36 produce a corresponding change in the current in the cathode circuit of the tube 100. The change in the current through the tube 100, of course, changes the current through the load element 122. It also changes the voltage developed across the resistor 124. The change in potential across the resistor 124 is applied to the feedback amplifier 126 to produce a change in the potential across the slidewire resistor 154. The change in the potential across this resistor is in such a direction as to reestablish a balanced condition at the summing junction 60 whereby to restore the potential at the junction to substantially zero. This much of the circuit operation just described constitutes a controller whose output is proportional to the magnitude of the input signal, the proportionality factor being determined by the relative magntiude of the capacitors 164 and 158 as well as the position of the slider 156 along the slidewire 154 and the gain of the amplifier 126. It is for this reason that the slidewire 154 together with the slider 156 is called the proportional band adjustment.

If it is desired, during the operation of this controller, to change the proportionality factor, this may be accomplished by changing the position of the slider 156 along the slidewire 154. If such a change is made, it may be seen that the balance condition at the summing junction 60 would be disturbed thereby, producing, at least momentarily, a change in the output signal applied to the load device 122. Thus, it would appear to the load device 122 that there had been a change in the input signal when, in fact, no such change had been made. In order to obviate such a situation, the holding capacitor 162 is used. Under any condition which has become static, a fixed voltage will be apparent across the capacitor 158. It may be seen that the capacitor 162 is connected between the upper end of the slidewire resistor 154 and ground. Therefore, a similar voltage will be present across the capacitor 162. If in this condition the switch 160 is reversed, first coupling the capacitor 162 in parallel with the capacitor 168, then removing the capacitor 158 from the operating circuit while connecting the capacitor 162 to input of the amplifier 36, the slider 156 will have been removed from operating connection with the amplifier circuit. In this condition, the slider may be moved to any desired new position and the grounding of the summing junction 60 through the reversing switch 160 will allow the capacitor 158 to reestablish balance before the switch 160 is returned to its normal position. With this arrangement the slider 156 may be moved to any new position desired without producing, even momentarily, a change in the output current through the load device 122.

If it is desired to include a rate or derivative function into the operation of the controller, the switch 34 may be closed. The closing of the switch 34 completes a circuit between the input junction 10 and the rate input to the amplifier 36 through the rate amplifier 13. If a change in signal is applied to the input terminals 2, this change will appear at the junction 10. When that change in signal is applied as input signal to the amplifier 13, the magnitude of the signal change is amplified by an amount representative of the gain of the amplifier 13. This gain factor may, typically, be on the order of ten. The amplified change signal is applied to the differentiating network comprising the capacitor 30 and the resistor 32. This network passes a signal which is a function of the rate of change of the input signal. The time constant of the rate network may be varied, in acordance with existing need, by the adjustment of the variable resistor 32. The rate signal is then applied as input signal to the control grid 48 of the tube 38, the first stage of the amplifier 36. This signal produces a change in the output current through the load device 122 which is proportional to the rate of change of the input signal. This signal, for a step change in input signal, for example, is of relatively short duration and decays to the level determined by the proportional function previously described.

In many instances, now well known in the art, it is desirable to include a further characterization of the output signal with respect to the input signal. This further characterization has become known as "reset" or integral function. The reset function is included in the operation of the circuit by closing switch 170. This introduces a signal component which is proportional to the time integral of the input signal. The closing of the switch 170 connects the summing junction 60, hence, one side of the rest capacitor 158, through the resistors 168, 166 and 8 to ground. So long as there is a signal appearing across the input terminals 2, then a portion of that signal appears at the junction between the input resistors 6 and 8. That junction being connected to the capacitor 158, there is provided a charging circuit for the capacitor. Since the circuit net is such that the summing junction 60 is held at substantially zero potential, the charge across the capacitor is balanced against the potential between the slider 156 of the slidewire 154, an increasing demand is made upon the output of the feedback amplifier 126. This increased demand can only be satisfied by increasing signal applied to the input of the amplifier 136 from the summing junction 60 due to the charging of the capacitor 158. The signal through the load device 122 is, thus, a time-integral of the input signal, for the duration of the input signal, plus a signal which is proportional to the magnitude of the input signal.

Thus, it may be seen that there has been provided an improved controller featuring three mode characterization of the output signal with respect to the input signal, which is capable of handling low-level direct current signals without resorting to the use of signal converters.

What has been claimed is:

1. An electronic controller comprising, in combination, a signal input circuit, a plural-stage amplifier circuit at least the first stage of which constitutes a differential amplifier stage having a first and a second input and the output stage of which comprises a cathode follower, a negative feedback circuit connected to said output stage, a feedback amplifier included in said feedback circuit, a slidewire resistor connected to the output of said feedback amplifier and having an adjustable slider thereon, a summing junction, a first capacitor connected between said summing junction and said slider, a second capacitor connected between said input circuit and said summing junction, means providing a variable high resistance path to ground from said summing junction, means connecting said summing junction to said first input of said first mentioned amplifier, and means for connecting a reference potential to said second input of said first mentioned amplifier.

2. An electronic controller as set forth in claim 1 and characterized by the addition of a third capacitor, said third capacitor being connected to said slidewire resistor, and switching means selectively operable between a first position whereat said summing junction is connected to said input to said first mentioned amplifier and said third capacitor is connected to ground and a second position whereat said summing junction is connected to ground and said third capacitor is connected to the input of said first mentioned amplifier.

3. An electronic controller comprising, in combination, a signal input circuit including a pair of controller input terminals and an input impedance means connected to one of said terminals, the other of said terminals being connected to a point of reference potential, a summing junction connected to said input impedance means, a plural stage direct current amplifier at least the first stage of which constitutes a differential amplifier stage, said plural stage amplifier having an output circuit connected to the last stage thereof, said first stage having a first and a second input means, means interconnecting said summing junction and said first input means of said first stage, a signal differentiating circuit interconnecting said one of said input terminals of said input circuit and said second input means of said first stage, said differentiating circuit including a serially connected further amplifier and a resistance-capacitance derivative network. said further amplifier including a first vacuum tube having an anode, a cathode, an a control grid, a second vacuum tube having an anode, a cathode, and a control grid, a power supply means having a first and a second terminal, a series circuit connected between said first and second terminals including the anode of said first tube, the cathode of said first tube, a first resistor and a second resistor, means for applying a reference bias to the cathode of said second tube, means connecting the anode of said second tube to the control grid of said first tube, connection means from said controller input terminals for applying a control signal between the control grid of said second tube and the junction between said first and second resistor, and an output of said further amplifier connected from the cathode of said first tube to said derivative network, a negative feedback circuit connected to said output of said first mentioned amplifier, said feedback circuit including a feedback amplifier, and means connecting the output of said feedback amplifier to said summing junction connected to said input circuit and said first input means of said first stage.

References Cited in the file of this patent

UNITED STATES PATENTS

| | | |
|---|---|---|
| 2,224,699 | Rust | Dec. 10, 1940 |
| 2,281,238 | Greenwood | Apr. 28, 1942 |
| 2,420,249 | Korman | May 6, 1947 |
| 2,459,046 | Rieke | Jan. 11, 1949 |
| 2,538,488 | Volkers | Jan. 16, 1951 |
| 2,677,729 | Mayne | May 4, 1954 |
| 2,741,668 | Iffland | Apr. 10, 1956 |
| 2,751,442 | Ketchledge | June 19, 1956 |
| 2,802,070 | Fishbine | Aug. 6, 1957 |
| 2,835,749 | McCormack | May 20, 1958 |
| 2,846,522 | Brown | Aug. 5, 1958 |
| 2,885,497 | Windsor | May 5, 1959 |
| 2,886,659 | Schroeder | May 12, 1959 |
| 2,903,522 | Flower | Sept. 8, 1959 |
| 2,921,193 | Eckert | Jan. 12, 1960 |
| 2,965,853 | MacDonald | Dec. 20, 1960 |
| 2,966,631 | Newbold | Dec. 27, 1960 |
| 3,020,490 | Kleiss | Feb. 6, 1962 |